United States Patent [19]

Fleischer

[11] 4,098,367
[45] Jul. 4, 1978

[54] AUTOMOTIVE VEHICLE SPEED CONTROL SYSTEM

[75] Inventor: Helmut Fleischer, Schwieberdingen, Fed. Rep. of Germany

[73] Assignee: Robert Bosch GmbH, Stuttgart, Fed. Rep. of Germany

[21] Appl. No.: 722,211

[22] Filed: Sep. 10, 1976

[30] Foreign Application Priority Data

Oct. 17, 1975 [DE] Fed. Rep. of Germany ....... 2546529

[51] Int. Cl.$^2$ ............................................. B60K 31/00
[52] U.S. Cl. .................................. 180/105 E; 123/102
[58] Field of Search ......................... 180/105 E, 105 R; 123/102

[56] References Cited

U.S. PATENT DOCUMENTS

| 3,893,537 | 7/1975 | Sakakibara | 180/105 E |
| 3,949,359 | 4/1976 | Sorkin | 180/105 E |
| 3,952,829 | 4/1976 | Gray | 180/105 E |

Primary Examiner—Joseph F. Peters, Jr.
Assistant Examiner—Donn McGiehan
Attorney, Agent, or Firm—Flynn & Frishauf

[57] ABSTRACT

To provide for digital storage of a command signal commanding a predetermined speed of the speed control system, a digital counter is provided forming a memory, connected to an analog-digital converter to generate a derived command signal in dependence on the counted state of the counter. Stray signals which may affect the count state of the counter thus can only change the time at which the counter reaches its predetermined count state, and not the count output thereof, whereas such stray pulses might otherwise affect the command signal. The counter holds the commanded speed as a count number.

11 Claims, 1 Drawing Figure

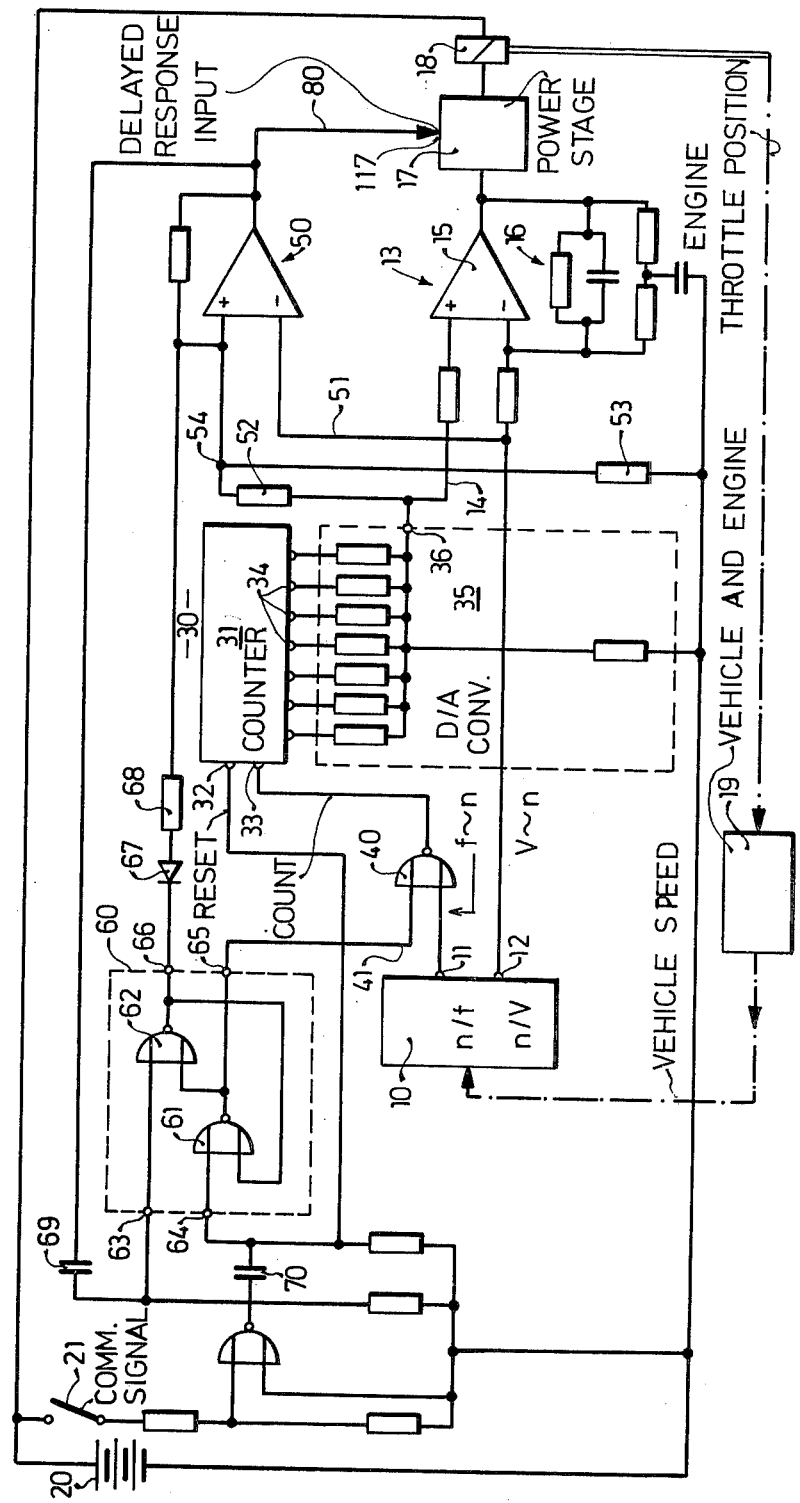

AUTOMOTIVE VEHICLE SPEED CONTROL SYSTEM

CROSS REFERENCE TO RELATED APPLICATION:

U.S. Ser. No. 720,027, filed July 16, 1976, Scheyhing et al assigned to the assignee of the present application.

The present invention relates to a speed control system for vehicles, and more particularly to a speed control system for automotive vehicles in which a speed command signal is generated and stored; this command signal is continuously compared with an actual speed signal to provide an error signal to control the speed of the vehicle to maintain the commanded speed.

BACKGROUND AND PRIOR ART

In its simplest form, automotive speed control systems utilize a tachometer generator which provides an output voltage which is converted into square wave pulses of constant, predetermined pulse duration, for example by a monostable multivibrator. An integrator, for example an R/C network, then determines the average value, providing a d-c output signal the amplitude of which is proportional to instantaneous vehicle speed. When the vehicle has reached the speed which is desired to be maintained, then a switch is operated and the then instantaneously appearing d-c voltage is stored in a capacitor. Upon charge of the capacitor to the voltage at the commanded speed, a command signal is available for later comparison with the actual speed signal. The voltage at the capacitor is sensed by means of a semiconductor element having a high resistance input, for further processing in the control system. Due to the unavoidable leakage currents as well as the loading of the semiconductor element — even though it may have a very high resistance input — the capacitor voltage will decrease. As a result, the commanded speed cannot be maintained constant over a long period of time by such a system.

It has also been proposed to utilize digital systems in which the square wave signals derived from the tachometer generator in a given time interval are summed in a counter so that the counter state will be a measure for the desired vehicle speed. Such system, however, include stray noise or other interference pulses in the count state so that the command speed number, as stored in the counter, may not conform to the actually desired command speed.

THE INVENTION

It is an object of the present invention to provide a control system, and more particularly a control system having a digital count storage arrangement in which a command signal can be precisely derived from the state of the actual speed signal at any given time and can be stored with high accuracy for an indefinite period of time.

Briefly, the storage or memory portion of the command system includes a pulse counter to which a digital-analog converter is connected to form the command signal from the count state stored in the counter. A comparator is provided to compare the actual speed and the command speed signal, the count state of the counter being terminated by the output signal of the comparator itself. The count state of the counter is thus changed continually until the output voltage of the digital-analog (D/A) converter conforms to the d-c voltage forming the actual speed signal. At that time, upon operation of a switch, the count state is stored in the counter. It does not matter, therefore, from where the pulses for the counter are derived — count pulses generated in the system or stray pulses. Thus, stray or noise or interference pulses cannot lead to a change in the commanded value; they can only influence the time at which the counting operation is terminated.

The system has the additional advantage that a clock generator with high frequency stability is not necessary. Any square wave signal can be used to cause the counter to count; thus, any square wave signal which is available in the control system anyway, for example the square wave signal derived from the tachometer generator, is suitable. Pulse signals are then applied to the counter at a pulse frequency which is proportional to, or at least representative of the vehicle speed. The counting time is thus essentially independent of the speed of the vehicle, assuming absence of stray pulses. If stray pulses occur, the counting time will be slightly shortened.

Such a hybrid digital-analog system can be constructed of components involving substantially smaller costs than the costs of the previously known analog memory systems, since semiconductor elements with sufficiently high input impedance so that they do not essentially load a capacitor are expensive. Assembly and test of the memory system of the memory arrangement of the vehicle control system are simplified and the number of rejects in manufacture is reduced.

The comparator can be connected to have a further function; in accordance with a feature of the invention, the comparator is connected to disable the control system if the actual speed deviates from the commanded speed by a predetermined value. This safety feature is desirable and indeed necessary to disable the speed control system upon braking of the vehicle, so that the speed control system will not have the tendency to accelerate the vehicle being braked. In accordance with this feature of the invention, the comparator has a reference voltage applied thereto which is changed when the counting cycle has terminated. The comparator thus has a dual function: During the storage cycle or storage portion of its operation, it compares the output signals of the D/A converter with the actual speed signal. When the desired speed is reached, a switch is operated, and this comparison is thereupon terminated and the number in the counter is stored. Upon termination of this storage portion, a voltage is placed on the comparator which represents a lesser vehicle speed. For control purposes, the actual vehicle speed signal is then compared with the commanded speed signal in a separate comparator.

DRAWING ILLUSTRATING AN EXAMPLE

The single FIGURE is a schematic diagram of the system.

The vehicle and engine, schematically represented by block 19, provide a speed output as shown schematically by the chain-dotted output line therefrom which is connected to an actual speed transducer 10 connected, for example, to the drive shaft of the vehicle or to one of the driven wheels, to the speed indicator cable for the dashboard, or the like. The actual speed transducer 10 provides a pulse signal at its output 11 which has a frequency proportional to vehicle speed. The output 12 provides a d-c voltage, the amplitude of which is proportional to vehicle speed. The d-c voltage at output 12 forms the actual vehicle speed control signal for comparator 13. Comparator 13 has a command signal applied thereto over conductor 14. Comparator 13 as its active element includes an operational amplifier 15 connected to a suitable feedback network 16. The output from operational amplifier 15 is a signal which depends on the difference between actual speed signal and command speed signal. It is connected to a power stage 17 to control a positioning system 18. Positioning system 18, for example, is an electromagnetically operating position controller which controls the throttle position of the engine of the vehicle-engine combination 19. Reference is made to the cross-referenced application Ser. No. 720,027, filed July 16, 1976, Scheyhing et al, assigned to the assignee of the present application, for details of the actual speed signal transducer 10, controller 13, the power stage 17 and of the positioning system 18. Other known components than those described in the foregoing application may be used and the system of the present invention is not limited to the system of the cross-referenced application.

A battery 20 provides operating power. A command signal switch 21 is provided which, when operated, stores a signal representative of the then existing speed of the vehicle. The remaining elements of the system are concerned with the memory or storage arrangement 30 in which data representative of a desired vehicle speed can be stored over an appreciable period of time.

The memory has as its primary component a counter 31 having a reset input terminal 32, a count input terminal 33 and a plurality of count outputs 34. The count outputs 34 are connected to a D/A converter 35 which, in its simplest form, may be a resistance network. Resistors directly connected to the counter are weighted in values having ratios 1 : 2 : 4 : 8 ... etc. The output 36 of the D/A converter will have a d-c voltage appear thereat which is proportional to and representative of the number counted in counter 31.

Count input 33 of counter 31 has count signals applied from transducer 10 through NOR-gate 40. NOR-gate 40 is opened if the control input 41 thereof has a 0-signal appear thereat, that is, if input 41 is at approximately chassis or reference potential.

The memory system 30 further includes a comparator 50. Line 51 connected to output 12 of transducer 10 has the actual speed signal applied thereto. Comparator 50 compares this signal with the output from terminal 36 of the D/A converter, applied through a resistor 52 and appearing at terminal 54. Resistors 52, 53 form a voltage divider. When the tap point 54 of the voltage divider has a signal thereat which is the same as the actual speed signal, comparator 50 changes state and its output 80 will have a 1-signal appear thereat.

The memory system additionally includes a control stage 60 which essentially is a bistable flip-flop constructed of NOR-gates 61, 62. Output 65 of the FF 60 is connected to line 41 and hence to the NOR-gate 40. Output 66 is connected through switching diode 67 and resistor 68 to the tap point 54 of the voltage divider. FF 60 has two inputs; one over capacitor 69 which feeds back the output signal from comparator 50; the other input is connected to a capacitor 70 which applies a signal triggered by operation of the command switch 21.

Operation: In quiescent state, control stage 60 will have a 1-signal at its output 65. Gate 40 is blocked, or inhibited. Thus, no pulses from the transducer 10 can be applied to the counter 31. The two inputs 63, 64 of the control stage 60 are at essentially reference potential.

If the operator of the vehicle has reached a speed which he desires to have maintained, he operates switch 21, closing the switch. This is a momentary-closing type switch. Upon closing, the voltage at input 64 of control stage 60 is instantaneously changed to a positive value by transfer of a pulse through capacitor 70. The voltage jump is also applied to the reset input 32 of the counter 31, so that the counter will have a predetermined count state appear therein, preferably zero or null. The voltage jump, transferred by capacitor 70, changes over the FF forming the control stage 60, so that the voltage at terminal 65 drops to approximately reference voltage, providing a 0-signal. This opens or unblocks gate 40 and pulses from the transducer terminal 11 are summed in the counter 31. The output voltage at terminal 36 from the D/A converter connected to voltage divider resistor 52, will change, in steps, and will eventually reach a value such that the voltage at the tap point 54 of the voltage divider formed by the resistors 52, 53 will correspond to that delivered by the transducer 10 at terminal 12. At that point, comparator 50 will change over and trigger the bistable FF 60 which is part of the control circuit. The output 65 thus changes again to approximately positive operating voltage, and gate 40 will block. The counter 31 will thus have a number stored therein which, after conversion by the D/A converter 35, is exactly proportional to the then pertaining speed signal delivered from transducer 10 at terminal 12.

As can be readily seen, stray pulses or lack of commanded pulses, that is, suppression of generated pulses, will not affect the count number of the counter; it will only affect the counting time. The accuracy of the memory and of storage is not influenced, since the count state in counter 31 is continually changed, that is, increases continually, until its output is compared in the comparator 50, after conversion into an analog value. Thus, counter 31 will have a number stored therein which will accurately represent the commanded speed.

The comparator 50 has the additional function of a safety circuit, by disabling the control system when the actual speed deviates from commanded speed by a predetermined value. Output line 80 from comparator 50 is connected to the power stage 17. Input terminal 117 of the power stage 17 is a disabling terminal from which the power stage 17 or the entire control system can be disconnected if the output of the comparator 50 has a 1-signal appearing for a predetermined period of time. This ensures that the control effect is disconnected upon braking of the vehicle, at the latest when the actual speed has dropped below a predetermined value with respect to the command speed.

Operation of safety circuit: Normally, Tap point 54 of the voltage divider formed by resistors 52, 53 will provide a reference voltage to the comparator 50, the value of which depends on the output voltage of the D/A converter 36 and the ratio of the resistors 52, 53. In accordance with the safety feature of the invention, the ratio of the voltage divider is changed by connecting the tap point 54 additionally through resistor 68 and diode 67 with the output of the control stage 60. Diode 67 is so poled that it becomes conductive when the output 66 of control stage 60 is at reference or zero potential. In this state, resistor 68 is, effectively, placed in parallel to resistor 53, thus decreasing the reference voltage at the tap point 54. If, however, the output 66 of the control stage has a 1-signal thereon, that is, is at the positive operating voltage of the system, diode 67 blocks so that the normal division ratio of the voltage divider, as determined by resistors 52, 53 is not influenced.

Output 66 is connected to be complementary with respect to output 65. Thus, the reference voltage drops as soon as the count portion of the operating cycle has terminated. The 1-signal of the output of the comparator 50 upon termination of the count state, which triggers stage 60 dynamically via capacitor 69, immediately disappears since the reference voltage at tap point 54 is decreased. This change-over is so rapid that wider normal conditions, the stage 17 cannot follow it, the output of the comparator 50 will have a 1-signal appear thereat only if the actual speed as represented by the voltage on line 51 drops below the voltage of the tap point 54, decreased because of the switched-in resistance 68 which simulates a lower speed. The count number in counter 31, and representing the command speed, is not changed however until, over command switch 21, a new count cycle is initiated.

For ease of analysis, the transducer 10 has been labeled with the symbols $n/f$ and $n/V$ to indicate that it changes a speed input to a frequency, and voltage, respectively; the outputs 11, 12 then provide frequency and voltage signals representative of speed, as shown in the drawing.

Various changes and modifications may be made within the scope of the inventive concept.

I claim:

1. Vehicle speed control system having
    means (10,) generating an actual vehicle speed signal representative of vehicle speed and having outputs (11, 12) providing said signal in digital ($n/f$) and in analog ($n/V$) form, said digital speed signals having a pulse frequency proportional to vehicle speed;
    means (40, 31, 60, 21) generating a command speed signal connected to the digital speed signal output (11) of said actual speed signal generating means including a digital counter (31) forming a memory (30) and a command transfer switch (21) transferring the actual speed signal in digital form into the counter (31) when the transfer switch (21) is operated;
    a vehicle speed control output (17, 18) connected to the vehicle engine to control the engine in accordance with the output signal from the vehicle speed control output;
    a digital/analog converter (35) connected to the counter (31) and generating the command signal;
    a control comparator (50) connected to, and comparing the actual speed signal in analog form ($n/V$) from the analog terminal (12) of the vehicle speed generating means (10), with the command speed signal from the digital/analog converter (35);
    means (69, 60, 65, 41, 40) connected to the output of the control comparator and to the count input of the counter (31) and terminating further counting when the comparison of the actual and commanded speed signal has a predetermined relationship so that the then existing actual speed signal is stored in the counter as a count state thereof;
    safety means (60, 66, 67, 68) connected to one of the inputs of the control comparator (50) to change the relationship between the input signals thereto representative of actual and commanded speed and at which the comparator provides an output in a direction to cause said control comparator (50) to provide an output when the difference between command speed and actual speed exceeds a predetermined value;
    and automatic speed control disabling means (80, 117) connecting the output of said comparator (50) to the vehicle speed control output (17, 18) to disable said speed control output (17, 18) if the speed difference exceeds said predetermined value.

2. System according to claim 1, wherein the command transfer switch (21) is manually operable and connected to reset the counter (31) to a predetermined count state and initiating counting thereof.

3. System according to claim 1, wherein said vehicle speed signal generating means (10) comprise a tachometer generator having a digital output (11) to provide an output signal having a frequency representative of actual vehicle speed and
    an analog output (12) to provide an output signal having a magnitude representative of actual vehicle speed.

4. System according to claim 1, wherein the means connecting the output of the comparator to the count input of the counter (31) include a control stage (60) having a bistable flip-flop with two dynamic inputs (63, 64), the inputs having applied thereto the output signal from the comparator and a "speed storage" signal derived from the transfer command switch (21);
    and a control gate (40) connected to the count input (33) of the counter (31) and controlled by the output of the control stage (60) to enable the gate upon operation of the switch (21) and to disable the gate upon receiving an output signal from the comparator (50) indicating that said predetermined relationship of command signal and actual speed signal has been attained.

5. System according to claim 1, wherein the means to change the relationship of said relative speeds includes a voltage divider (52, 53, 68) and switching means (67) changing the voltage division ratio of said comparator.

6. System according to claim 1, wherein the safety means includes a stage (60) having a safety control output (66);
    and connection means (67, 68) connected to one of the inputs of the control comparator (50) and modifying its input to provide an output signal if the difference between the actual speed signal and the commanded speed signal exceeds said predetermined value;
    said output signal from the comparator (50) being connected to the vehicle speed control output (17, 18) to disable said vehicle speed control output (17, 18) when said predetermined speed difference is exceeded, said control comparator (50) thereby
    (a) providing a count-termination signal to the counter (31) when the command speed is to be entered in the counter and, further,
    (b) providing a disabling signal to the vehicle speed control output (17, 18) if the speed difference between commanded speed and actual speed exceeds said predetermined value,
    whereby said control comparator (50) will have dual functions.

7. System according to claim 1, wherein the means connecting the output of the comparator to the count input of the counter include a control stage (60) having a bistable circuit with dynamic inputs (63, 64), the inputs having applied thereto the output signal from the comparator (50) and a "speed storage" signal derived from the transfer command switch (21);

a control gate (40) connected to the count input (33) of the counter (31) and controlled by the output of the control stage (60) to enable the gate upon operation of the transfer command switch (21) and to disable the gate upon receiving an output signal from the comparator (50) indicating that said predetermined relationship of command signal and actual speed signal has been obtained;

and wherein the safety means includes said control stage, said control stage having a safety control output (66);

and connection means connected to one of the inputs of the comparator (50) and modifying its input to provide an output signal from the comparator if the difference between the actual speed signal and the commanded speed signal exceeds said predetermined value;

said output signal from the comparator (50) being further connected to the vehicle speed control output (17, 18) to disable said vehicle speed control output (17, 18) when said predetermined speed difference is exceeded, said control comparator (50) thereby (a) providing a count-termination signal to the counter (31) when the command speed is to be entered in the counter and, further (b) providing a disabling signal to the vehicle speed control output (17, 18) if the speed difference between commanded speed and actual speed exceeds said predetermined value, whereby said control comparator (50) will have dual functions.

8. System according to claim 1 wherein the automatic speed control disabling means includes a delay response input (117) to the control output (17, 18) to disable the control output when the signal at set delay response input persists beyond a momentary occurrence.

9. System according to claim 7 wherein the automatic speed control disabling means includes a delay response input (117) to the control input (17, 18) to disable the control output when the signal at set delay response input persists beyond a momentary occurrence.

10. System according to claim 6 wherein the automatic speed control disabling means includes means (117) discriminating between an output from said comparator forming the count termination signal and the disabling signal.

11. System according to claim 10 wherein said discriminating means comprises said dynamic input to the control stage (60) to sense initial occurrence of the output signal from the comparator (50) and, if short time, forming the count termination signal, and a delayed-response input (117) to the control output (17, 18) to become effective when the output signal from said comparator (50) persists in excess of the momentary occurrence.

* * * * *